(12) United States Patent
Yamagishi

(10) Patent No.: US 7,253,979 B2
(45) Date of Patent: Aug. 7, 2007

(54) METHOD AND DEVICE FOR DATA READ/WRITE, RECORDING MEDIUM, AND PROGRAM PRODUCT

(75) Inventor: Michinaga Yamagishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/903,903

(22) Filed: Jul. 30, 2004

(65) Prior Publication Data
US 2005/0207048 A1   Sep. 22, 2005

(30) Foreign Application Priority Data
Mar. 19, 2004   (JP)   ............... 2004-080260

(51) Int. Cl.
  G11B 20/14   (2006.01)
  G11B 5/09    (2006.01)
  G11B 5/596   (2006.01)
(52) U.S. Cl. .................. 360/40; 360/39; 360/48
(58) Field of Classification Search ........... 360/39
  See application file for complete search history.

(56) References Cited

U.S. PATENT DOCUMENTS 5,371,721 A * 12/1994 Greidanus et al. ....... 369/13.14
5,402,272 A * 3/1995 Nakatsu et al. ............... 360/39
6,175,456 B1 * 1/2001 Yun ............................. 360/46
6,624,957 B1 * 9/2003 Yun ............................. 360/25
6,633,514 B1   10/2003 Awano et al. ............ 369/13.28
6,735,028 B1 * 5/2004 Rothschild et al. ........... 360/40

OTHER PUBLICATIONS

"Multilevel Signal transfers", Oct. 1, 1978, IBM Technical Disclosure Bulletin, vol. No. 21, Issue No. 5, pp. 1798-1800.*

* cited by examiner

*Primary Examiner*—Andrea Wellington
*Assistant Examiner*—Jason Olson
(74) *Attorney, Agent, or Firm*—Greer, Burns & Crain, Ltd.

(57) ABSTRACT

A data read/write device includes a data write-processing unit that performs amplitude modulation on write data to obtain an amplitude-modulated signal that contains a plurality of amplitude levels, correlates a plurality of data included in the write data with each amplitude level of the amplitude-modulated signal to obtain amplitude data, and transmits the amplitude data to a magnetic head that writes the amplitude data into a memory area of a recording medium, and a data read-processing unit that reads the amplitude data via the magnetic head from each memory area of the recording medium, and converts the amplitude data into readable read data.

6 Claims, 6 Drawing Sheets

AMPLITUDE SPECIFICATION TABLE

| WRITE DATA | | AMPLITUDE |
|---|---|---|
| 0 | 0 | I1 |
| 0 | 1 | I2 |
| 1 | 0 | I3 |
| 1 | 1 | I4 |

FIG.4

COMPARISON TABLE

| COERCIVE FORCE LEVEL VALUE | READ DATA | |
|---|---|---|
| H1 | 0 | 0 |
| H2 | 0 | 1 |
| H3 | 1 | 0 |
| H4 | 1 | 1 |

WHEN THERE ARE TWO HEADS AT OUTFLOW END

WHEN THERE ARE THREE HEADS AT OUTFLOW END

WHEN THERE IS HEAD BOTH AT OUTFLOW END AND INFLOW END

METHOD AND DEVICE FOR DATA READ/WRITE, RECORDING MEDIUM, AND PROGRAM PRODUCT

BACKGROUND OF THE INVENTION

1) Field of the Invention

The present invention relates to a device, a method, and a computer product which can be used for recording large volumes of data to a recording medium or reproducing large volumes of data recorded on the recording medium, with a magnetic head, thereby increasing the data storage capacity.

2) Description of the Related Art

Recent years have seen a sudden jump in the storage capacity of hard disk drives (HDD), an annual rate exceeding 100%. This trend can be anticipated in the future HDDs as well.

One way of increasing the HDD storage capacity is to increase the number of magnetic disks in the HDD. However, most of the HDDs used in desktop computers are placed in an HDD bay having fixed thickness. Hence, the HDD bay cannot accommodate too many built-in magnetic disks.

Therefore, in the conventional technology, to record large volumes of data on a stand-alone magnetic disk, the storage capacity of the HDD is increased by increasing recording densities such as a linear density, which is the density in the rotation direction of the media, and a track density, which is the density in the radial direction of the track (refer to Chapter 6, Nikkei Byte, "Personal Computer Technical System 2003 Hardware", Nikkei Byte Co. Ltd.)

However, by increasing the linear density and the track density of the magnetic disk, the storage capacity of the magnetic disk can only be increased to a certain extent, in the conventional technology.

This is because the recording surface per bit of the magnetic disk on which the magnetic head can perform read/write operation, has reached its limit: Reducing the recording surface by further increasing the linear density and the track density results in undesirable yield ratio, and is considerably expensive.

Therefore, it is essential to increase the storage capacity of the magnetic disk without increasing the linear density and the track density.

SUMMARY OF THE INVENTION

It is an object of the invention to at least solve the problems in the conventional technology.

A data read/write device according to an aspect of the present invention includes a data write-processing unit that performs amplitude modulation on write data to obtain an amplitude-modulated signal that contains a plurality of amplitude levels, correlates a plurality of data included in the write data with each amplitude level of the amplitude-modulated signal to obtain amplitude data, and transmits the amplitude data to a magnetic head that writes the amplitude data into a memory area of a recording medium; and a data read-processing unit that reads the amplitude data via the magnetic head from each memory area of the recording medium, and converts the amplitude data into readable read data.

A recording medium according to another aspect of the present invention includes a plurality of memory layers, in a thickness direction, each with different coercive force depending on a magnetization intensity of the magnetic materials, wherein data is recorded onto the recording medium by magnetizing the magnetic material of the memory layers.

A data read/write method according to still another aspect of the present invention includes write-processing that includes performing amplitude modulation on write data to obtain an amplitude-modulated signal that contains a plurality of amplitude levels, correlating a plurality of data included in the write data with each amplitude level of the amplitude-modulated signal to obtain amplitude data, and transmitting the amplitude data to a magnetic head that writes the amplitude data into a memory area of a recording medium; and read-processing that includes reading the amplitude data via the magnetic head from each memory area of the recording medium, and converting the amplitude data into readable read data.

A computer program according to still another aspect of the present invention causes a computer to execute the method according to the present invention.

A computer-readable recording medium according to still another aspect of the present invention stores the computer program according to the present invention.

The other objects, features, and advantages of the present invention are specifically set forth in or will become apparent from the following detailed description of the invention when read in conjunction with the accompanying drawings.

DETAILED DESCRIPTION

Exemplary embodiments of a data read/write device, a recording medium, a data read/write method, and a computer product according to the present invention are explained next with reference to the accompanying drawings.

Figure 1:
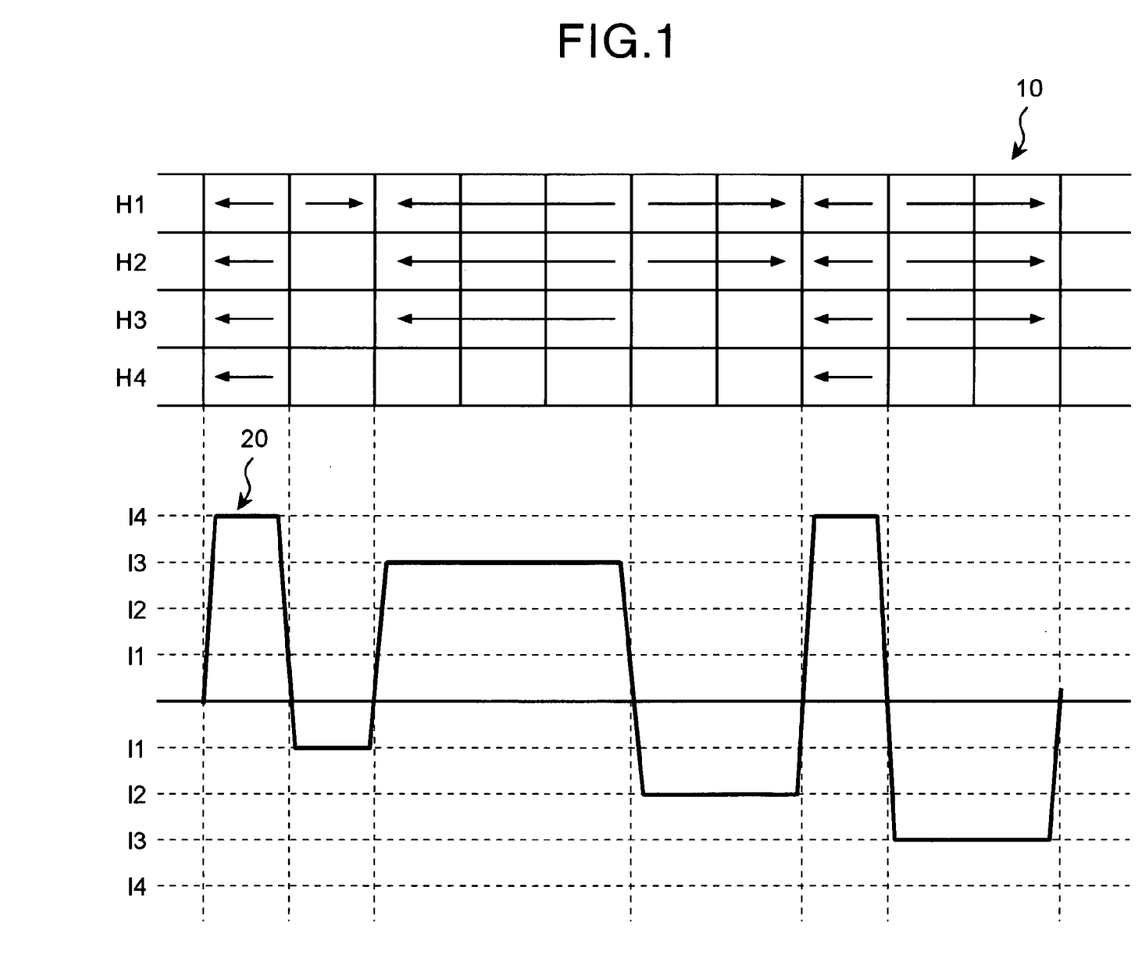
FIG. 1 illustrates a concept of data recording according to an embodiment of the present invention.

A concept of data recording according to the present embodiment is explained first. FIG. 1 illustrates the concept of data recording according to the present embodiment. A magnetic disk 10 includes a plurality of memory layers that record the data in the thickness direction of a disk. Though memory layers H1, H2, H3, and H4 are considered here for the sake of explanation, the magnetic disk 10 may have any number of memory layers.

Each of the memory layers H1, H2, H3, and H4 has a different coercive force that magnetizes a magnetic material included in the memory layers H1, H2, H3, and H4. The coercive force of the memory layer H2 is stronger than that of the memory layer H1, the coercive force of the memory layer H3 is stronger than that of the memory layer. H2, and the coercive force of the memory layer H4 is stronger than that of the memory layer H3.

Therefore, the memory layer H1 is easier to magnetize than the memory layer H2, the memory layer H2 is easier to magnetize than the memory layer H3, and the memory layer H3 is easier to magnetize than the memory layer H4.

An alternating current 20 is transmitted to a head, for recording data to and reading data from the magnetic disk 10 via a data read/write device (explained later). The current transmitted to the head has four levels of amplitudes, namely, I1, I2, I3, and I4, wherein the amplitude I2 is greater than the amplitude I1, the amplitude I3 is greater than the amplitude I2, and the amplitude I4 is greater than the amplitude I3. I1, I2, I3, and I4 correspond to respective predetermined binary data.

The head emits magnetic field lines on the magnetic disk 10 based on the amplitude of the received current and magnetizes the corresponding memory layer. As shown in FIG. 1, when the amplitude of the current is I1, only the memory layer H1 is magnetized, when the amplitude of the current is I2, the memory layers H1 and H2 are magnetized, when the amplitude of the current is I3, the memory layers H1, H2, and H3 are magnetized, and when the amplitude of the current is I4, the memory layers H1, H2, H3, and H4 are magnetized.

The head reads, from the magnetic disk 10, which of the memory layers H1, H2, H3, and H4 is magnetized, and transmits the read value to the data read/write device as a coercive force level value. The data read/write device converts the coercive force level value received, to read data.

Thus, reading/recording of the data is carried out using the magnetic disk 10 that includes a plurality of memory layers. Therefore, large volumes of data can be recorded on the magnetic disk without having to increase the linear density or the track density.

Figure 2:
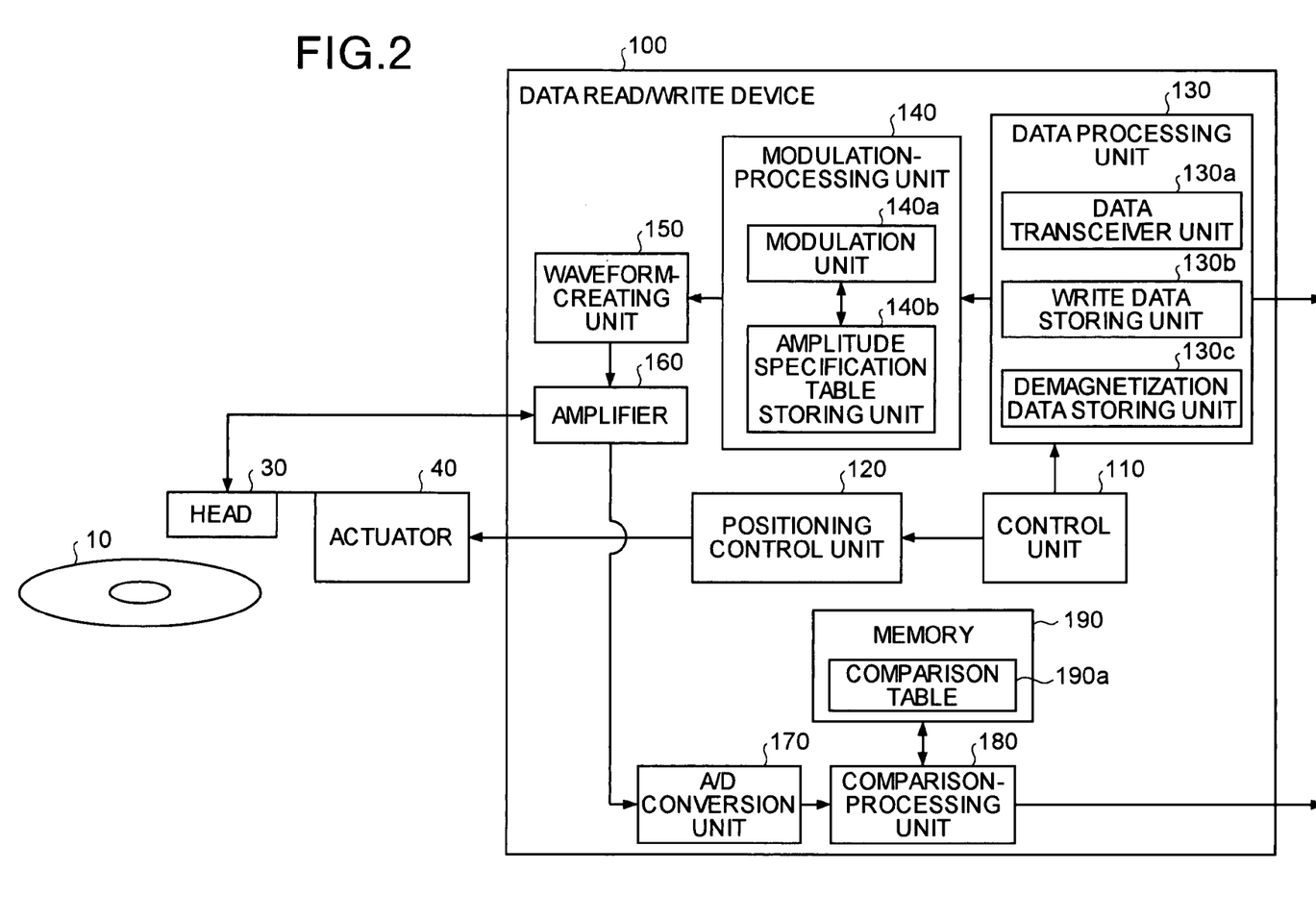
FIG. 2 is functional block diagram of a data read/write device according to the embodiment of the present invention.

FIG. 2 is a functional block diagram of the data read/write device. A data read/write device 100 includes a control unit 110, a positioning control unit 120, a data processing unit 130, a modulation-processing unit 140, a waveform-creating unit 150, an amplifier 160, an A/D conversion unit 170, a comparison-processing unit 180, and a memory 190.

The control unit 110 controls the positioning control unit 120 and the data processing unit 130. The positioning control unit 120 operates an actuator 40 according to instructions received from the control unit 110, and moves a head 30 to a desired position on the magnetic disk 10.

Based on the instructions received from the control unit 110, the data processing unit 130 transmits either write data or demagnetization data to the modulation-processing unit 140. The write data indicates the data to be recorded on the magnetic disk 10, and the demagnetization data indicates the data to be erased from the magnetic disk 10. The data processing unit 130 includes a data transceiver unit 130a, a write data storing unit 130b, and a demagnetization data storing unit 130c.

Based on the instructions received from the control unit 110, the data transceiver unit 130a transmits the write data or the demagnetization data to the modulation-processing unit 140. The data transceiver unit 130a receives the write data from an external device (not shown) and stores the write data received, in the write data storing unit 130b. The demagnetization data storing unit 130c stores the demagnetizing data.

The modulation-processing unit 140 performs amplitude modulation of the write data received from the data processing unit 130, to obtain an alternating current with predetermined amplitude. The modulation-processing unit 140 transmits the modulated alternating current to the waveform-creating unit 150. The modulation-processing unit 140 includes a modulation unit 140a, and an amplitude specification table storing unit 140b.

Figure 3:
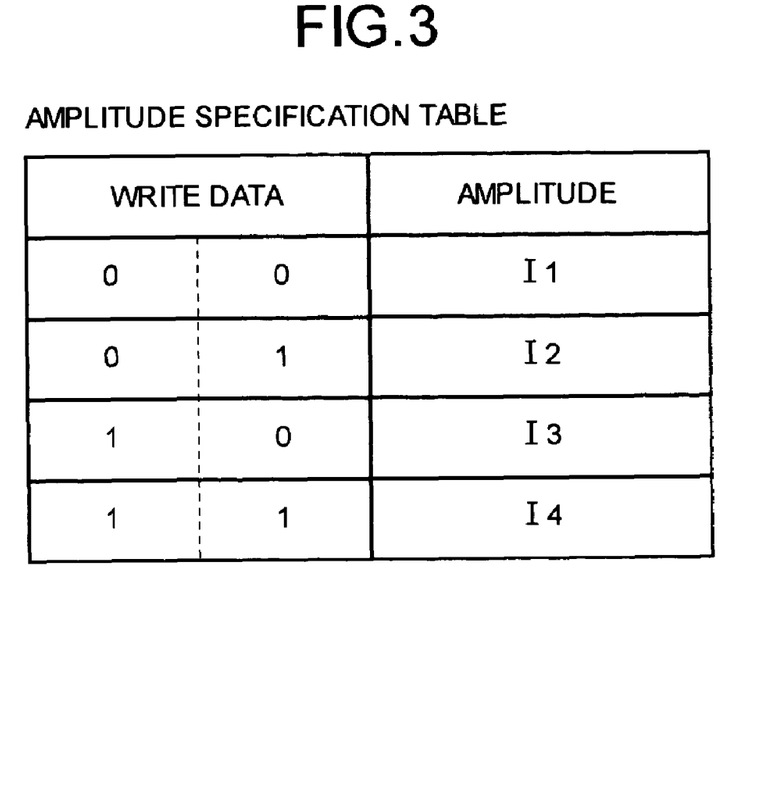
FIG. 3 is an example of an amplitude specification table.

Based on an amplitude specification table stored in the amplitude specification table storing unit 140b, the modulation unit 140a performs amplitude modulation on the alternating current corresponding to the write data. FIG. 3 is an example of the amplitude specification table.

The amplitude specification table contains the write data and the corresponding amplitudes. The amplitude specification table indicates that when the write data is '00', the amplitude of the corresponding current is modulated to 'I1'. When the write data is '01', the amplitude of the corresponding current is modulated to 'I2'. When the write data is '10', the amplitude of the corresponding current is modulated to 'I3', and when the write data is '11', the amplitude of the corresponding current is modulated to 'I4'.

For instance, when the write data '101001100011' is received from the data processing unit 130, the modulation unit 140a performs amplitude modulation of the alternating current with the sequence of amplitudes being 'I3, I3, I2, I3, I1, I4', and transmits the created alternating current to the waveform-creating unit 150.

When the demagnetizing data is received from the data processing unit 130, the modulation unit 140a creates a high frequency alternating current having constant amplitude of I4, to neutralize the magnetization of the magnetic material of the magnetic disk 100, and transmits the created alternating current to the waveform-creating unit 150.

Thus, the modulation-processing unit 140 sets the amplitude of the alternating current into four levels, carries out amplitude modification by correlating each amplitude with a 2-bit value, namely correlating the amplitude I1 with 00, I2 with 01, I3 with 10, and I4 with 11, and transmits the amplitude-modulated alternating current to the waveform-creating unit 150.

The waveform-creating unit 150 creates a waveform of the amplitude-modulated alternating current received from the modulation-processing unit 140, and transmits the waveform alternating current to the amplifier 160. The amplifier 160 amplifies the waveform alternating current received from the waveform-creating unit 150, and transmits the amplified alternating current to the head 30. The amplifier 160 receives the coercive force level value from the head 30, and amplifies and transmits the received coercive force level value to the A/D conversion unit 170.

The head 30 receives the alternating current from the amplifier 160, emits the magnetic field lines on the magnetic disk 10 based on the amplitude of the alternating current received, and magnetizes the magnetic material of the corresponding memory layers one by one.

While reading the recorded data from the magnetic disk 10, the head 30 reads the coercive force level value from the magnetic disk 10, and transmits the coercive force level value to the amplifier 160.

The A/D conversion unit 170 receives the coercive force level value from the amplifier 160, and converts the received coercive force level value to a digital value. The A/D conversion unit 170 transmits the converted coercive force level value (hereinafter "digital coercive force level value") to the comparison-processing unit 180.

Figure 4:
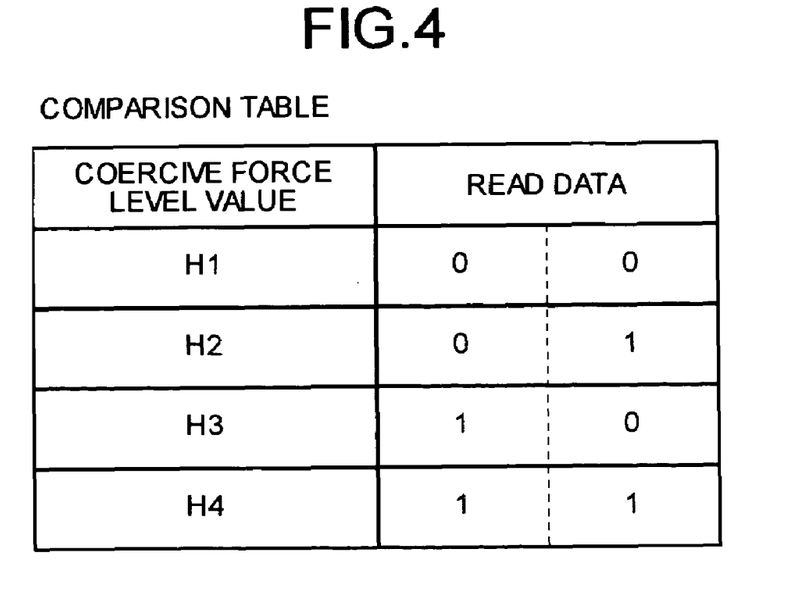
FIG. 4 is an example of a comparison table.

The comparison-processing unit 180 converts the digital coercive force level value received from the A/D conversion unit 170 to the read data using a comparison table 190a stored in the memory 190. FIG. 4 is an example of the comparison table.

The comparison table 190a contains the coercive force level values and the corresponding read data. The comparison table 190a indicates that when the coercive force level value is 'H1', the corresponding read data is '00'. When the coercive force level value is 'H2', the corresponding read data is '01'. When the coercive force level value is 'H3', the corresponding read data is '10', and when the coercive force level value is 'H4', the corresponding read data is '11'.

Thus, if the digital coercive force level value 'H3, H3, H2, H3, H1, H4' is received from the A/D conversion unit 170, the comparison-processing unit 180 generates the read data '101001100011', and transmits the read data to the external device (not shown).

Figure 5:
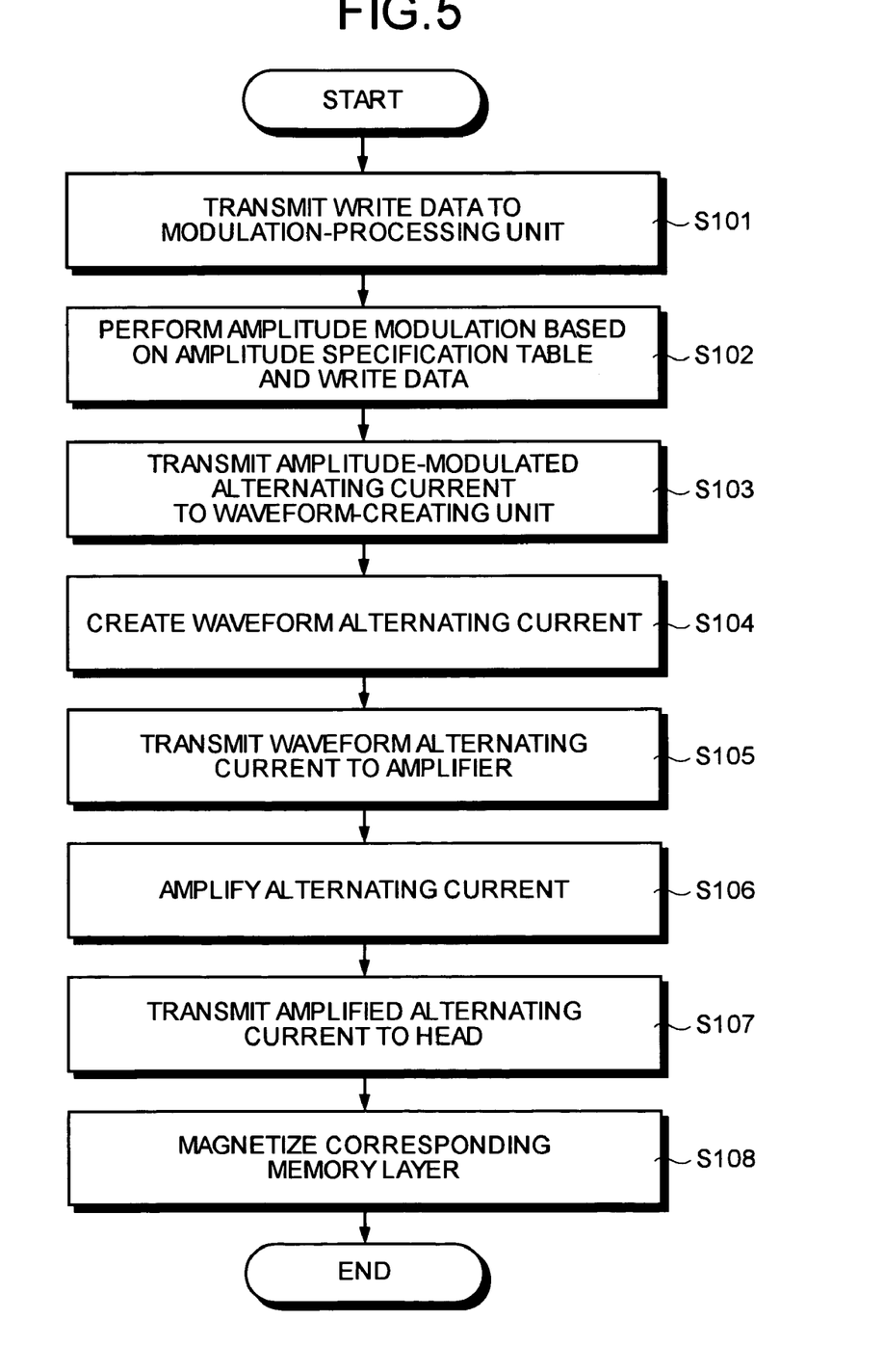
FIG. 5 is a flowchart of a process procedure for recording data.

A process by which the data read/write device 100 records data to the magnetic disk 10 is explained next. FIG. 5 is a flow chart of the process of recording data. The data processing unit 130 transmits the write data to the modulation-processing unit 140 (Step S101). The modulation-processing unit 140 performs amplitude modulation based on the amplitude specification table and the write data (Step S102).

The modulation-processing unit 140 transmits the amplitude-modulated alternating current to the waveform-creating unit 150 (Step S103). The waveform-creating unit 150 creates a waveform alternating current (Step S104), and transmits the waveform alternating current to the amplifier 160 (Step S105).

The amplifier 160 amplifies the alternating current (Step S106), and transmits the amplified alternating current to the head 30 (Step S107). The head 30 magnetizes the corresponding memory layer of the magnetic disk 10 (Step S108).

Thus, the modulation-processing unit 140 performs the amplitude modulation based on the write data and the amplitude specification table. The waveform-creating unit 150 creates a waveform of the amplitude-modulated alternating current, and the amplifier 160 amplifies the waveform alternating current. Based on the amplified waveform alternating current, the head 30 magnetizes the corresponding memory layer of the magnetic disk 10. Consequently, two-bit data is recorded in each magnetic domain of the magnetic disk 10.

Next, the process of demagnetization of the write data of the magnetic disk 10 is described in detail. For demagnetizing the write data, the data processing unit 130 of the data read/write device 100 transmits the demagnetizing data to the modulation-processing unit 140. The modulation unit 140a generates a high frequency alternating current having constant amplitude I4, transmits the alternating current to the head 30 via the waveform-creating unit 150 and the amplifier 160, and demagnetizes the write data one by one.

Figure 6:
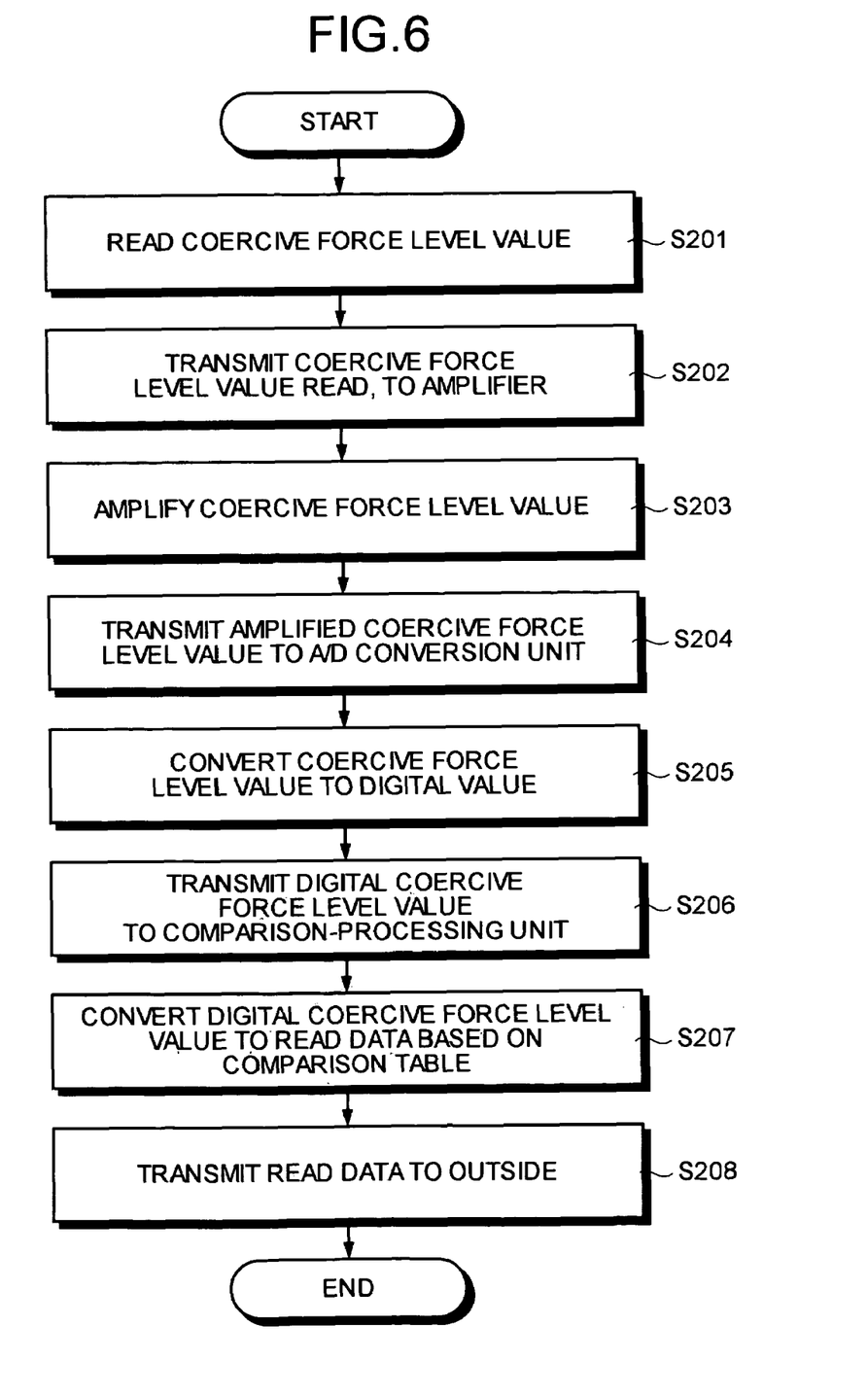
FIG. 6 is a flowchart of a process procedure for reading data.

A process by which the data read/write device 100 reads data is explained next. FIG. 6 is a flowchart of a process procedure for reading data. The head 30 reads the coercive force level value from the magnetic disk 10 (step S201), and transmits the coercive force level value read, to the amplifier 160 (step S202).

The amplifier 160 amplifies the coercive force level value (step S203), and transmits the amplified coercive force level value to A/D conversion unit 170 (step S204). The A/D conversion unit 170 converts the coercive force level value to a digital value (step S205), and transmits the digital coercive force level value to the comparison-processing unit 180 (step S206).

Based on the comparison table 190a, the comparison-processing unit 180 converts the digital coercive force level value to the read data (step S207), and transmits the read data to the outside (step S208).

To sum up, in the present embodiment, the data processing unit 130 transmits the write data to the modulation-processing unit 140. The modulation-processing unit 140 creates the amplitude-modulated alternating current based on the write data, and transmits the created alternating current to the head 30, via the waveform-creating unit 150 and the amplifier 160. The head 30 magnetizes the corresponding memory layer of the magnetic disk 10, and thus records the data. Thus, large volume of data is recorded without increasing the track density and the linear density of the magnetic disk 10.

Though data recording, data reading, and data demagnetization in the present embodiment is carried out using one head, a plurality of heads may be used.

Figure 7:
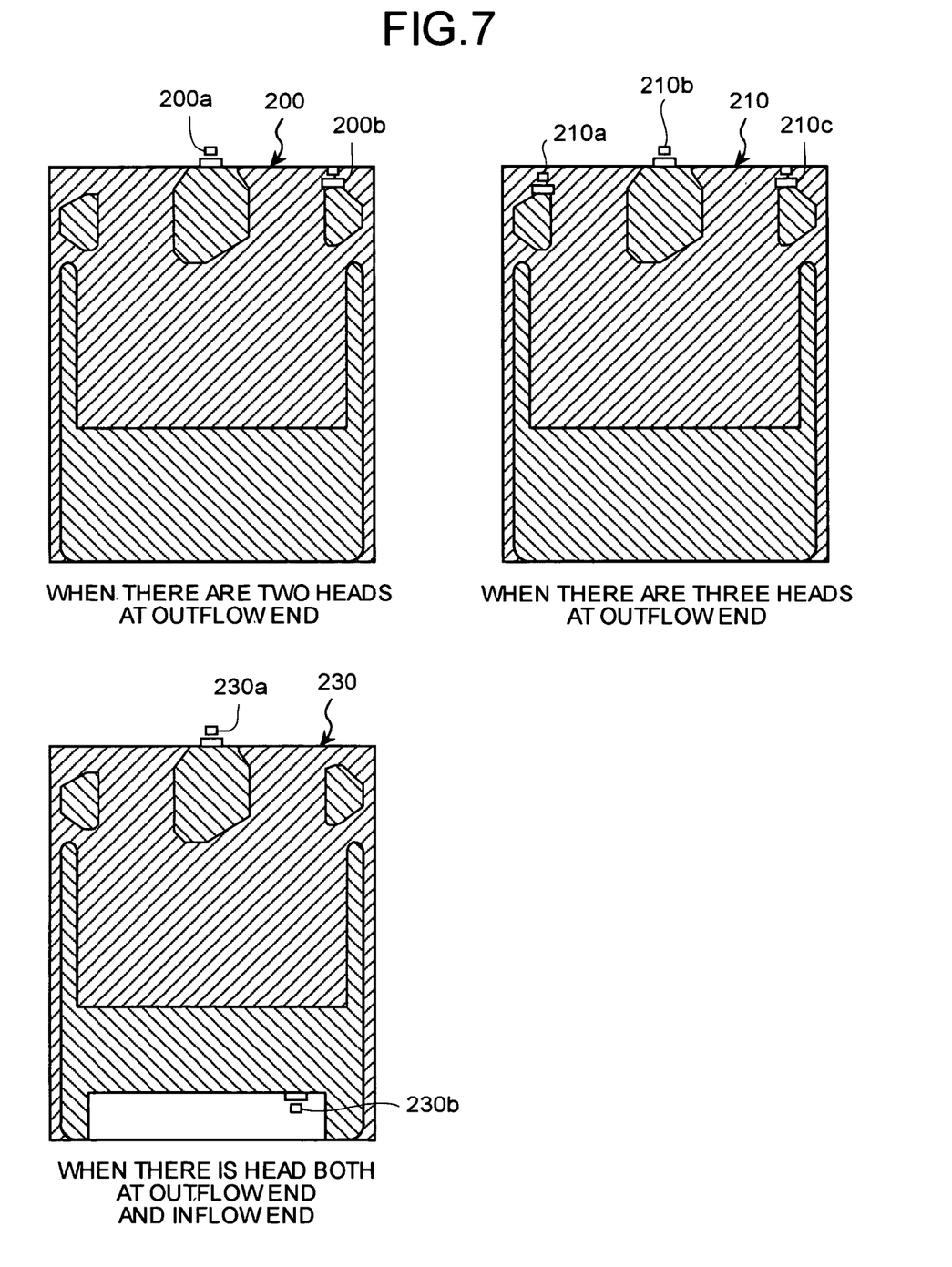
FIG. 7 illustrates an instance when there are a plurality of heads.

For instance, as shown in FIG. 7, a slider 200 may be arranged to include two heads at the outflow end through which the air flows out. One head 200a performs data recording and data reading, and the other head 200b performs data demagnetization. The slider (not described in the above embodiment) holds the head as well as maintains a constant distance between the head and the magnetic disk using a lifting force of the air generated by the rotation of the magnetic disk.

Alternatively, a slider 210 may be arranged to include a head 210b for data recording and data reading, and heads 210a and 210c for data demagnetization. A slider 230 is provided with a head 230a for demagnetizing the data at the outflow end, and a head 230b for recording and reading the data at the inflow end through which air flows in.

Like these sliders 200, 210, and 230, the recording, reading, and demagnetization of data can be performed efficiently using a plurality of heads simultaneously.

The arrangements of heads for recording, reading, and demagnetizing the data, shown in FIG. 7, are just examples. The heads may be arranged anyhow.

According to the present invention, the capacity of the recording medium can be drastically increased.

Moreover, the data recorded on the recording medium can be accurately converted to a readable data.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A data read/write device comprising:
   a data write-processing unit that performs amplitude modulation on write data to obtain an amplitude-modulated signal that contains a plurality of amplitude levels for each period of said amplitude-modulated signal, correlates a plurality of data included in the write data with each amplitude level of the amplitude-modulated signal to obtain amplitude data, and transmits the amplitude data to a magnetic head that writes the amplitude data into a memory area of a recording medium; and
   a data read-processing unit that reads the amplitude data via the magnetic head from each memory area of the recording medium, and converts the amplitude data into readable read data.

2. The data read/write device according to claim 1, wherein the data write-processing unit includes:
   a modulation data storing unit that stores modulation data, which indicates a correlation between the amplitude levels of the amplitude-modulated signal with the plurality of data included in the write data; and a modulating unit that performs amplitude modulation on the write data based on the modulation data stored.

3. The data read/write device according to claim 1, wherein, the data read-processing unit includes:
- a conversion data storing unit that stores conversion data, which indicates a correlation between the amplitude data and the read data; and
- a conversion unit that converts the amplitude data to the read data based on the conversion data stored.

4. The data read/write device according to claim 1, wherein a plurality of magnetic heads perform the functions of reading, recording, and demagnetizing of the amplitude data.

5. A data read/write method comprising:
- write-processing that includes performing amplitude modulation on write data to obtain an amplitude-modulated signal that contains a plurality of amplitude levels for each period of said amplitude-modulated signal, correlating a plurality of data included in the write data with each amplitude level of the amplitude-modulated signal to obtain amplitude data, and transmitting the amplitude data to a magnetic head that writes the amplitude data into a memory area of a recording medium; and
- read-processing that includes reading the amplitude data via the magnetic head from each memory area of the recording medium, and converting the amplitude data into readable read data.

6. A computer-readable recording medium that contains a computer program that includes instructions which when executed on a computer causes the computer to execute:
- write-processing that includes performing amplitude modulation on write data to obtain an amplitude-modulated signal that contains a plurality of amplitude levels for each period of said amplitude-modulated signal, correlating a plurality of data included in the write data with each amplitude level of the amplitude-modulated signal to obtain amplitude data, and transmitting the amplitude data to a magnetic head that writes the amplitude data into a memory area of a recording medium; and
- read-processing that includes reading the amplitude data via the magnetic head from each memory area of the recording medium, and converting the amplitude data into readable read data.

* * * * *